No. 767,911. Patented August 16, 1904.

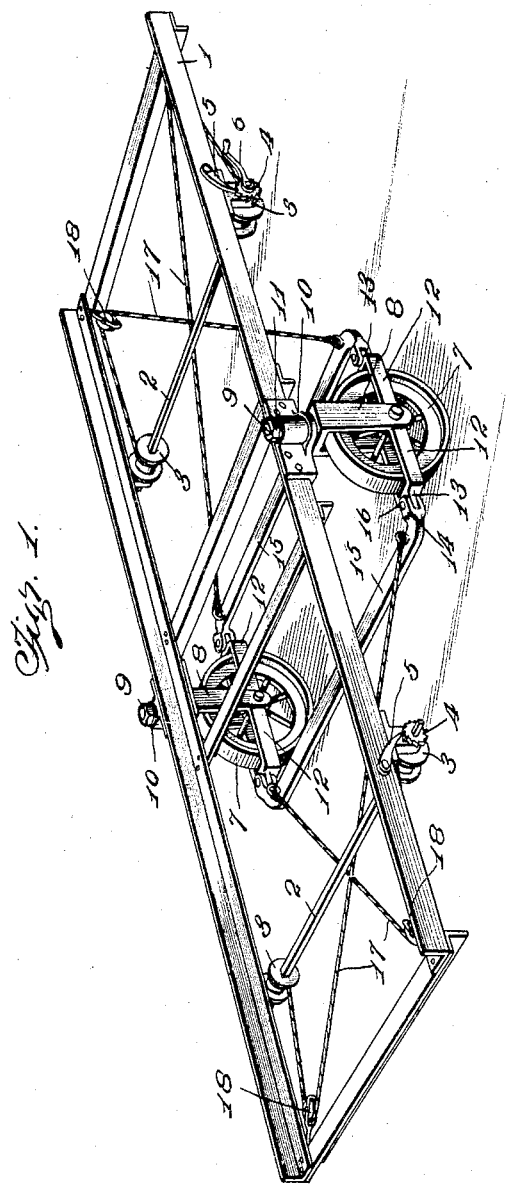

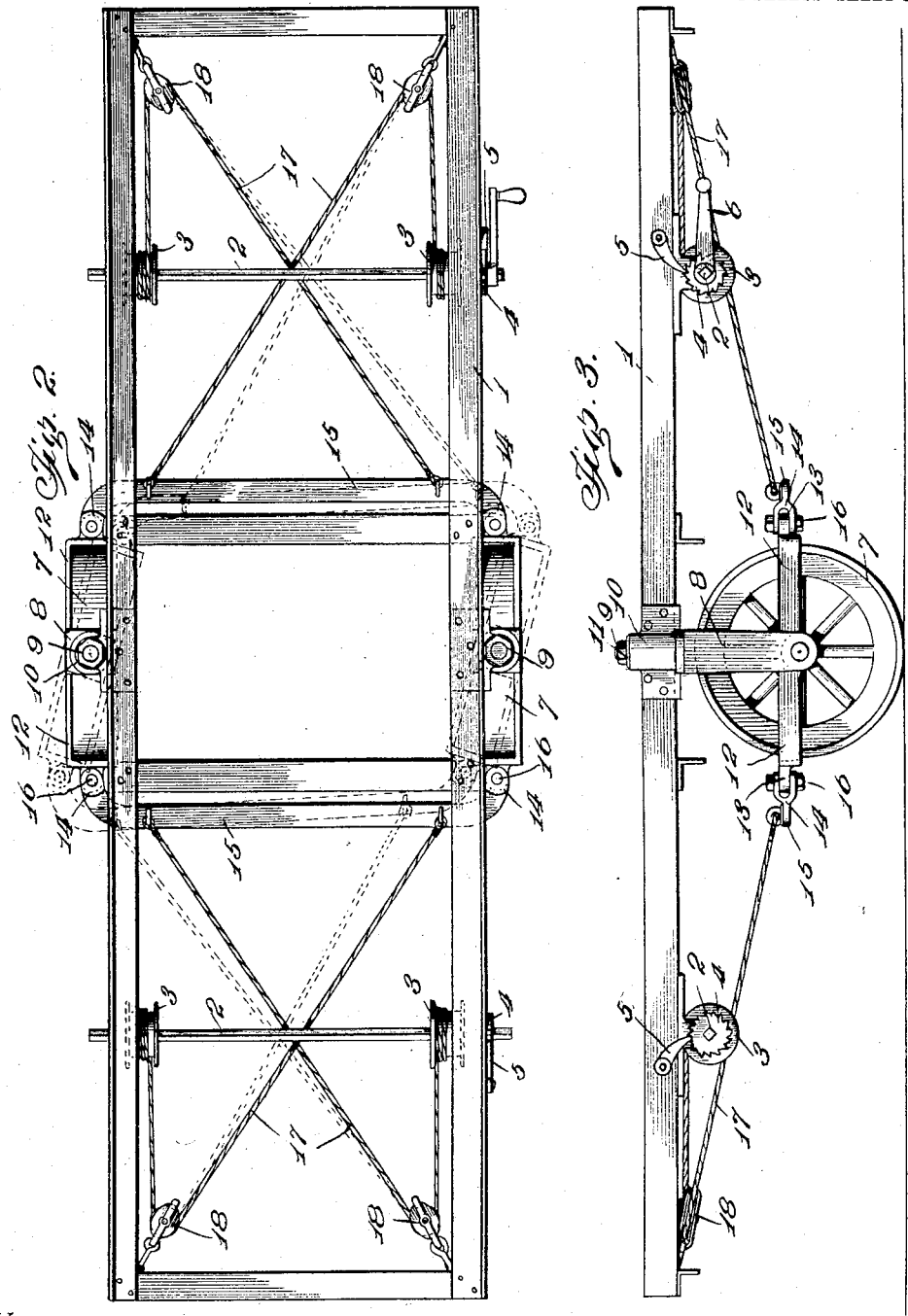

UNITED STATES PATENT OFFICE.

WILLIAM LEGGETT McCABE, OF SEATTLE, WASHINGTON.

SWIVEL-TRUCK.

SPECIFICATION forming part of Letters Patent No. 767,911, dated August 16, 1904.

Application filed September 28, 1903. Serial No. 174,976. (No model.)

*To all whom it may concern:*

Be it known that I, WILLIAM LEGGETT MC-CABE, a citizen of the United States, residing at Seattle, in the county of King and State of Washington, have invented certain new and useful Improvements in Swivel-Trucks; and I do hereby declare the following to be a full, clear, and exact description of the invention, such as will enable others skilled in the art to which it appertains to make and use the same.

This invention relates to improvements in trucks, and particularly to trucks designed for carrying portable conveyers.

The object in view is the provision of means for transporting a portable conveyer, which means shall be susceptible of adjustment of its supporting-wheels for facilitating altering the direction of movement, means being provided for locking such wheels in their adjusted positions.

With this and further objects in view the invention consists, in combination with a framework, of supporting-wheels swiveled thereto, and means carried by the framework engaging such wheels for swinging the same upon their swivels to various adjusted positions, and means for locking said wheels in such adjusted positions.

It also consists in certain other novel constructions, combination, and arrangement of parts, as will be hereinafter fully described and claimed.

In the accompanying drawings, Figure 1 represents a perspective view of a truck embodying the features of the present invention. Fig. 2 represents a top plan view of the same. Fig. 3 represents a view in side elevation of the same.

In the handling of portable conveyers I have found it desirable to provide means for facilitating the carrying of such conveyers from place to place, the ordinary trucks now in use being found by me to be wholly insufficient for the purpose. The enormous weight of a portable conveyer makes it practically impossible to move the same about on an ordinary truck supported by rigidly-mounted wheels, as it is often found desirable to move the conveyer laterally as well as longitudinally, and the fixed wheels of the ordinary truck are not adapted for such movement. I provide for such lateral shifting of a conveyer by the employment of the elements disclosed in the accompanying drawings in which 1 indicates any suitable supporting framework carrying at each end a rotatably-mounted shaft 2, each of which shafts carries winding-drums 3. Each shaft 2 is provided with a ratchet-wheel 4, engaged by a suitable pawl 5, carried by the frame 1, and any suitable rotating mechanism, as a crank 6, may be applied to the respective shafts 2 for rotating the same when desired.

Preferably positioned centrally of the frame 1 are supporting-wheels 7 7, each carrying a fork 8, mounted upon its axle, each of the said forks 8 being provided with a central vertically-projecting shaft 9, extending through a bearing-sleeve 10, fixed to the frame 1. A suitable nut or other retaining means 11 may be mounted on the upper end of the shaft 9 to prevent displacement of the parts. It will be seen that the arrangement described provides a support for the framework, while permitting the free horizontal pivotal movement of the forks 8 and the wheels inclosed thereby, the weight of the frame 1 and the elements carried thereby being sustained by the shoulders of the forks 8. Extending laterally from each side of each arm of each fork 8 is a strap 12, said straps extending beyond the periphery of the respective wheel 7 and the outer ends of the pairs of straps being connected together and formed with a lug 13, inclosed by the bifurcated end 14 of a connecting-link 15, extending transversely of the frame 1 and connecting the respective pairs of straps 12, a pivot-pin 16 extending through each bifurcated end of each link 15 and through the respective lugs 13. The wheels 7 are thus pivotally connected together, so that any lateral horizontal swinging or pivotal movement of one must occasion a similar movement of the opposite wheel.

A cable 17 is connected to one end of link 15 and extends diagonally across the frame 1 to and passes through a suitable block 18 and engages one of the drums 3, a similar cable 17 being connected with the opposite end of said link and extending diagonally across the frame 1, crossing the first-mentioned cable and passing through a similar block to the drum 3 opposite that engaged by the first-mentioned cable. Similarly-arranged cables 17 engage the opposite link 15 and extend to the respective drums 3, passing through similar blocks 18. The cables 17 at one end of the frame 1 are arranged to engage the respective drums 3 in such manner that rotation of the shaft 2 is designed to pay out one of said cables and to take up the other at a corresponding rate of speed. The drum 3 at one end of the frame 1 engages its respective cable in such manner as to pay out the same at the time the cable carried by the drum at the opposite end of the framework 1 on the opposite side of said framework is paying out its cable 17, the other two drums taking up their respective cables in a degree corresponding to the amount of cable paid out by the first-mentioned drums.

In operation the portable conveyer is mounted upon the framework 1 and may be moved by any suitable power to a desired point. When it is desired to move such framework laterally, it is only necessary to rotate one of the shafts 2 for swinging the wheels or casters 7 upon their pivots until they assume the desired diagonal position. When an operating device, as a crank 6, is applied to one of the shafts 2 and said shaft is rotated, one of the cables 17 will be paid out and the other taken up, whereby the given link 15 will be caused to swing longitudinally, pivoting the wheels 7 and correspondingly swinging the opposite link 15, whereby one of the cables 17 at the opposite end of the framework from that carrying the shaft being rotated will be drawn, owing to the movement of said link 15, and caused to pay out a distance sufficient for accommodating the movement of the links 15 and the elements connected therewith. The paying out of the last-mentioned cable of course rotates the shaft 2, carrying the drum to which said cable is connected, whereby the cable carried by the opposite drum of said shaft will be taken up. When the wheels 7 have assumed the desired position, the pawl-and-ratchet mechanism carried by the respective shaft 2 will effectually prevent any pivotal movement of the wheels 7 until such movement is desired.

Although I have described the present improved truck as designed particularly for carrying portable conveyers, it will be observed that the same may be employed for any of the common uses and particularly when articles of considerable weight are to be moved.

Having thus fully described my invention, what I claim as new, and desire to secure by Letters Patent, is—

1. In a truck, the combination with a frame, of wheels pivotally supporting the same, means connected with said wheels for effecting uniform pivotal movement thereof, flexible operating means engaging said connecting means near one side of said frame and extending to the other side thereof, and similar operating means engaging said connecting means near the side of said frame opposite the point of attachment of the first-mentioned operating means and extending across the first-mentioned operating means.

2. In a truck the combination with a frame, of carrying-wheels pivotally supporting the same, a rigid link extending transversely of said frame and pivotally connecting the wheels for effecting uniform pivotal movement thereof, means for moving said link longitudinally for pivoting the wheels, and a locking device for preventing pivotal movement of the wheels.

3. In a truck the combination with a frame, of supporting-wheels pivotally connected thereto, a strap engaging each of said wheels, a rigid link extending transversely of said frame and at its ends pivotally engaging said straps, means for swinging said link longitudinally, and means for locking the same against movement.

4. In a truck, the combination with a frame, of supporting-wheels therefor, a fork engaging the axle of each of said wheels, a shaft extending from each of said forks, a bearing-sleeve inclosing said shaft, means for connecting said forks for effecting uniform pivotal movement of said wheels, and a cable engaging said connecting means for moving the same.

5. In a truck, the combination with a frame, of wheels supporting and pivotally connected with the same, a link connecting said wheels, and cables connected with said link for adjusting said wheels pivotally.

6. In a truck, the combination with a frame, of supporting-wheels therefor pivotally connected therewith, a link connecting said wheels, a cable connected with one end of said link, a take-up drum engaging said cable, a cable connected with the opposite end of said link, and a take-up drum engaging the same.

7. In a truck, the combination with a frame, of supporting-wheels pivotally connected thereto, a link connecting said wheels, drums carried by said frame, means for effecting synchronous rotation, of said drums, a cable connected with one end of said link and extending to one of said drums, and engaging the upper surface thereof, and a cable connected with the opposite end of said link and extending to the other of said drums and engaging the under surface thereof, whereby rotation of said drums is designed to pay out one cable and take up the other.

8. In a truck, the combination with a frame, of supporting-wheels pivotally connected therewith, a link connecting said wheels, a shaft rotatably mounted in said frame, drums carried by said shaft, cables connected to said link and extending to said drums, and means for locking said shaft against rotation.

9. In a truck, the combination with a frame, of supporting-wheels pivotally connected therewith, a link connecting said wheels, blocks mounted in said frame, drums carried by the frame, a cable connected with one end of said link extending through one of said blocks and engaging one of the drums, and a cable connected with the opposite end of said link, extending through the other of said blocks, and engaging the other drum.

10. In a truck, the combination with a frame, of supporting-wheels pivotally connected therewith, a link connecting said wheels, blocks carried by said frame, drums carried by the frame, a cable connected to one end of said link and extending diagonally across said frame, passing through one of said blocks, and engaging one of said drums, and a cable connected with the opposite end of said link, extending diagonally across said frame, passing through the other of said blocks, and engaging the other drum.

11. In a truck, the combination with a frame, of supporting-wheels pivotally connected therewith, a rigid bar at each side of said wheels extending transversely of the frame and pivotally connecting the wheels, and cables engaging said bars for actuating the same.

In testimony whereof I hereunto affix my signature in presence of two witnesses.

WILLIAM LEGGETT McCABE.

Witnesses:
RICHARD SAXE JONES,
B. F. STUART.